US010569702B2

(12) United States Patent
Baker et al.

(10) Patent No.: US 10,569,702 B2
(45) Date of Patent: Feb. 25, 2020

(54) VEHICLE STATUS INDICATOR LAMP

(71) Applicant: Valeo North America, Inc., Troy, MI (US)

(72) Inventors: Patton Davis Baker, Seymour, IN (US); Gavin Warner, Seymour, IN (US); John Orisich, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/864,443

(22) Filed: Jan. 8, 2018

(65) Prior Publication Data
US 2019/0210517 A1 Jul. 11, 2019

(51) Int. Cl.
*B60Q 1/50* (2006.01)
*B60Q 1/52* (2006.01)
*G07C 5/08* (2006.01)
*G05D 1/00* (2006.01)

(52) U.S. Cl.
CPC ............... *B60Q 1/50* (2013.01); *B60Q 1/52* (2013.01); *G07C 5/0825* (2013.01); *B60Q 2400/10* (2013.01); *B60Q 2400/20* (2013.01); *G05D 1/0088* (2013.01)

(58) Field of Classification Search
None
See application file for complete search history.

(56) References Cited

U.S. PATENT DOCUMENTS

| 4,640,727 A | 2/1987 | Janssen |
| 6,616,312 B2 | 9/2003 | Carter |
| 8,585,262 B2 | 11/2013 | Singhal |
| 8,764,256 B2 | 7/2014 | Foote et al. |
| 2012/0320613 A1 | 12/2012 | Singhal |
| 2014/0140088 A1* | 5/2014 | Griebel ................ B60Q 1/38 362/555 |
| 2015/0022994 A1* | 1/2015 | Bingle ................ G01D 13/20 362/23.01 |
| 2015/0353000 A1 | 12/2015 | Kowatzki |
| 2016/0159286 A1* | 6/2016 | Harville ............. B60Q 1/2665 340/438 |
| 2017/0088040 A1 | 3/2017 | Williams et al. |
| 2017/0120804 A1 | 5/2017 | Kentley et al. |
| 2017/0240098 A1* | 8/2017 | Sweeney ............ B60Q 1/2611 |
| 2018/0090001 A1* | 3/2018 | Fletcher ............ G08G 1/096775 |
| 2018/0188726 A1* | 7/2018 | Newman ............ G01C 21/3407 |

FOREIGN PATENT DOCUMENTS

DE 10 2015 212 652 A1 12/2017

OTHER PUBLICATIONS

International Search Report dated Apr. 8, 2019 in PCT/US2019/012714, 15 pages.

* cited by examiner

*Primary Examiner* — Leon Viet Q Nguyen
(74) *Attorney, Agent, or Firm* — Oblon, McClelland, Maier & Neustadt, L.L.P.

(57) ABSTRACT

A lighting system for an autonomous vehicle includes one or more optical fiber panels or optical signaling system positioned about a perimeter of the autonomous vehicle; and processing circuitry configured to activate the one or more optical fiber panels or the optical signaling system in a predetermined illumination in response to a status of the autonomous vehicle, wherein the status includes one or more of a time of day, a number of passengers occupied within the autonomous vehicle, and an alert status during operation of the autonomous vehicle.

10 Claims, 10 Drawing Sheets

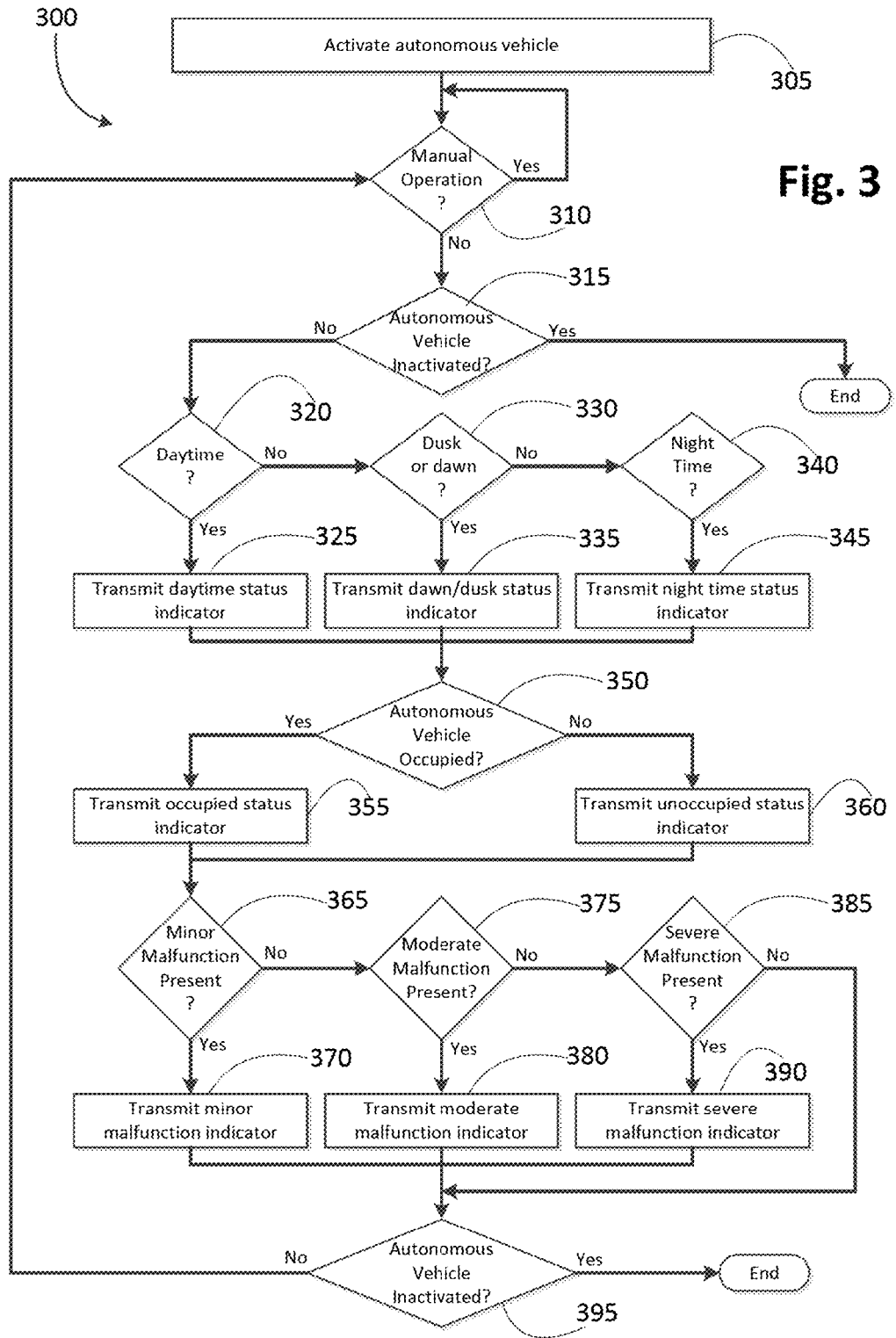

VEHICLE STATUS INDICATOR LAMP

BACKGROUND

Several types of vehicle lamps are used to provide a message to surrounding vehicles and pedestrians, such as head lamps, tail lamps, brake lamps, and signal lamps. These lamps provide an indication of the presence of the vehicle during limited visibility, and they provide a warning of an impending action by the vehicle. Activation of these lamps is usually via a manual activation.

For autonomous vehicles, i.e. unmanned vehicles, additional indicators may be necessary to provide a status of the autonomous vehicle, especially in an environment when both autonomous and non-autonomous vehicles are sharing the roadways. In addition, activation of the additional indicators will be provided via a controller.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

Embodiments described herein include the following aspects.

(1) A lighting system for an autonomous vehicle includes one or more optical fiber panels or optical signaling system positioned about a perimeter of the autonomous vehicle; and processing circuitry configured to activate the one or more optical fiber panels or the optical signaling system in a predetermined illumination in response to a status of the autonomous vehicle, wherein the status includes one or more of a time of day, a number of passengers occupied within the autonomous vehicle, and an alert status during operation of the autonomous vehicle.

(2) The lighting system for an autonomous vehicle of (1), wherein the processing circuitry is further configured to transmit an electrical signal representative of the status to one or more surrounding autonomous vehicles.

(3) The lighting system for an autonomous vehicle of either one of (1) or (2), wherein the status is determined via sensor data and status data received from the autonomous vehicle.

(4) The lighting system for an autonomous vehicle of any one of (1) through (3), wherein the alert status includes a malfunction status of the autonomous vehicle.

(5) The lighting system for an autonomous vehicle of any one of (1) through (4), wherein the predetermined illumination includes one or more of a color, a geometry, or a pattern of illumination.

(6) The lighting system for an autonomous vehicle of any one of (1) through (5), wherein the one or more optical fiber panels or the optical signaling system is configured to illuminate in a plurality of colors, a plurality of streaming rates, and a plurality of geometries.

(7) The lighting system for an autonomous vehicle of any one of (1) through (6), further includes a plurality of optical fiber panels bundled together about the perimeter of the autonomous vehicle.

(8) The lighting system for an autonomous vehicle of any one of (1) through (7), wherein at least one optical fiber panel is dedicated for a predetermined status.

(9) The lighting system for an autonomous vehicle of any one of (1) through (8), wherein at least one optical fiber panel is configured to be activated according to a priority of statuses.

(10) The lighting system for an autonomous vehicle of any one of (1) through (9), wherein the optical signaling system includes one of a lens, a reflector, or a light-emitting diode (LED).

(11) A status indication controller for an autonomous vehicle includes one or more alert databases; an alert engine configured to receive data from one air more sensors of the autonomous vehicle and determine an alert message using data from the one or more alert databases; a status engine configured to receive data from the one or more sensors of the autonomous vehicle and determine a status message; a transmitting engine configured to transmit the determined alert message and the deter mined status message to the autonomous vehicle; and processing circuitry interconnecting the one or more alert databases, the alert engine, the status engine, and the transmitting engine and configured to activate optical fiber panel circuitry of a status indicator of the autonomous vehicle.

(12) The status indication controller for an autonomous vehicle of (11), wherein each of the one or more alert databases has one or more illumination categories of alert notifications.

(13) The status indication controller for an autonomous vehicle of either one of (11) or (12), wherein the determined status message includes one of a time of day, a number of passengers occupied within the autonomous vehicle, and a manual operation.

(14) The status indication controller for an autonomous vehicle of any one of (11) through (13), wherein the processing circuitry is further configured to activate the optical fiber panel circuitry of the status indicator to provide an illumination format for one or more of color, streaming, and geometry.

(15) The status indication controller for an autonomous vehicle of any one of (11) through (14), wherein the processing circuitry is further configured to transmit a respective electrical signal representative of the determined alert message and the determined status message to one or more surrounding autonomous vehicles.

(16) A method of indicating a status of an autonomous vehicle includes determining, via time and position data received by a status engine, a time of day of the autonomous vehicle; determining, via passenger data received by the status engine, a number of passengers occupied within the autonomous vehicle; determining, via diagnostic data received by an alert engine, a malfunction within the autonomous vehicle; and transmitting, via a transmitting engine, status data from, the determined time of day, the determined number of passengers, and the determined malfunction to a status indicator of the autonomous vehicle, wherein processing circuitry interconnects the status engine, the alert engine, and the transmitting engine and is configured to transmit the status data to optical fiber panel circuitry of the status indicator of the autonomous vehicle.

(17) The method of indicating a status of an autonomous vehicle of (16), wherein determining the malfunction further includes determining a severity of the malfunction; selecting an alert database based upon the determined severity; and forming an alert message from one or more illumination categories of the selected alert database according to the malfunction.

(18) The method of indicating a status of an autonomous vehicle of either one of (16) Of (17), further includes transmitting an electrical signal representative of the status data to one or more surrounding autonomous vehicles.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 illustrates an autonomous vehicle status algorithm according to one embodiment;

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another.

Systems, devices, and methods are described herein for a status indicator of an autonomous vehicle. The status includes, but is not limited to a time of day during operation of the autonomous vehicle, a manual operation of the autonomous vehicle, a number of passengers during operation of the autonomous vehicle, and an alert status during operation of the autonomous vehicle.

Embodiments described herein provide lighting modules having one or more solid state light sources. As used herein, a solid state light source refers to a type of light source using an electroluminescence phenomenon in which a material emits light in response to passage of an electric current or in response to a strong electric field. Examples of light sources include, but are not limited to semiconductor light-emitting diodes (LEDs), organic light-emitting diodes (OLEDs), polymer light-emitting diodes (PLEDs), and monolithic light-emitting diodes (MLEDs). Lighting modules described herein can also include one or more bulb sources, such as a halogen light source or a high intensity discharge (HID) light source.

Figure 1:
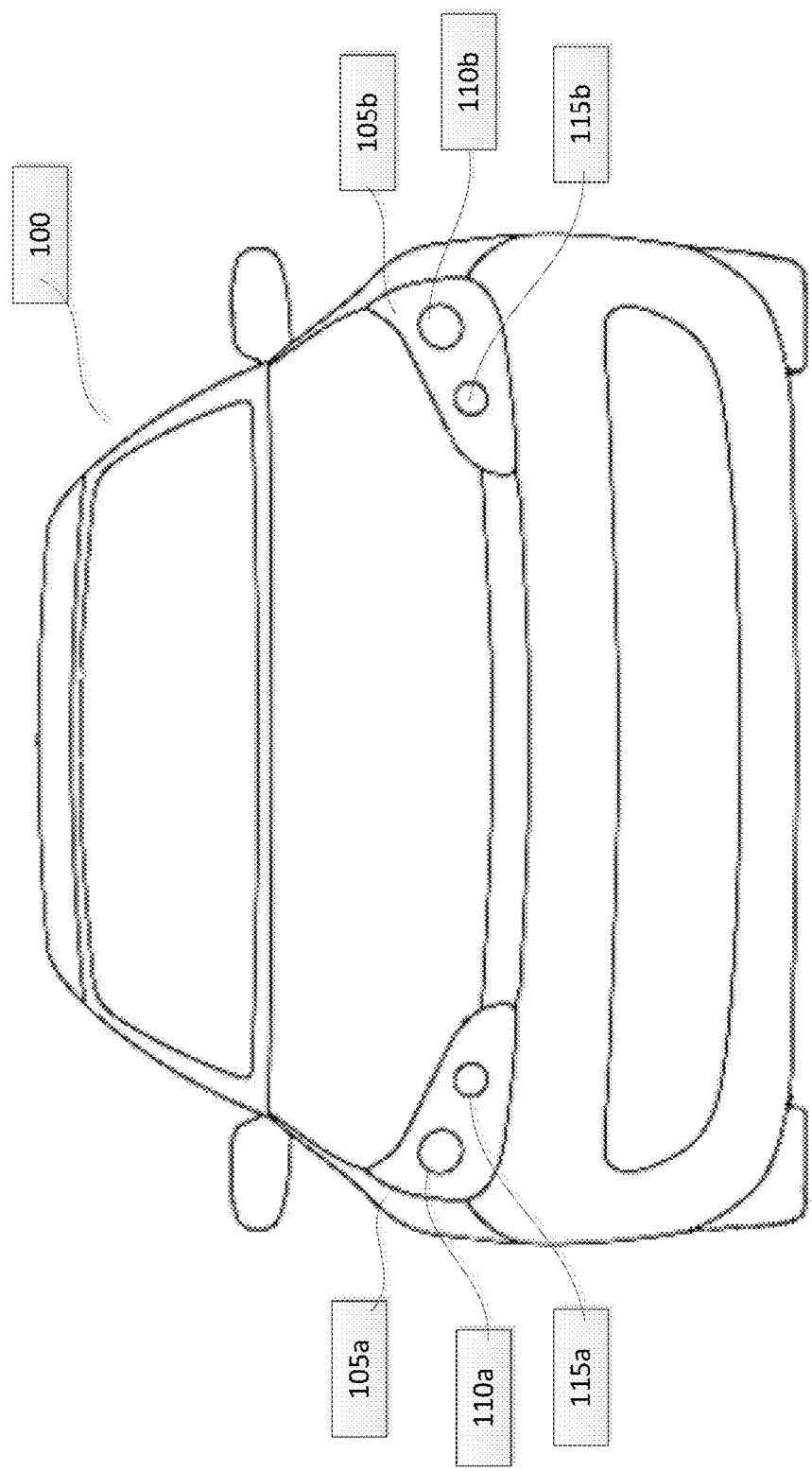
FIG. 1 illustrates a front-end of an exemplary motor vehicle according to one embodiment.

FIG. 1 illustrates a front-end of an exemplary motor vehicle 100. Motor vehicle 100 includes two headlamp assemblies 105a and 105b. Headlamp assemblies 105a and 105b include low beam headlamps 110a and 110b (also referred to as a lower or dipped beam) and high beam headlamps 115a and 115b (also referred to as a main or driving beam). Typically, the low beam headlamps 110a and 110b are used whenever another vehicle is on the road directly ahead of motor vehicle 100 and/or whenever another vehicle is approaching motor vehicle 100 from an opposite direction.

Figure 2A:
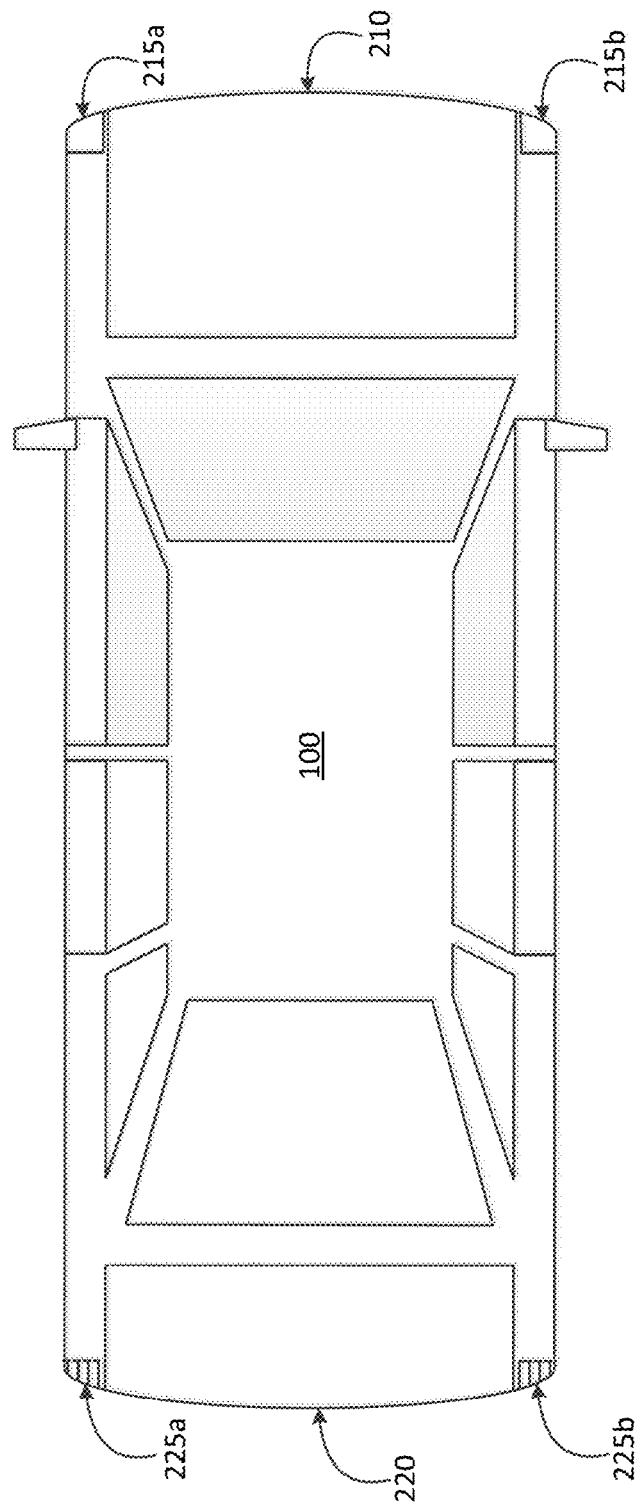
FIG. 2A illustrates a top view of an exemplary motor vehicle according to one embodiment.

FIG. 2A illustrates a top view of motor vehicle 100. A front end 210 and a back end 220 are illustrated. In addition to lighting functions, motor vehicle 100 illustrates signaling functions. Front lamp assemblies 215a and 215b represent signaling functions, such as a combination turn signal and parking lamp or a combination parking, lamp daytime running lamp (DRL). Each of the front lamp assemblies 215a and 215b can be separate from headlamp assemblies 105a and 105b or they can be incorporated into the same assembly module.

FIG. 2A also illustrates rear lamp assemblies 225a and 225b. Rear lamp assemblies 225a and 225b represent signaling functions, such as a combination brake lamp and tail lamp or a combination tail lamp and a turn signal lamp. Each of the rear lamp assemblies 225a and 225b can include separate modules for each signaling lamp function or they can be incorporated into the same assembly module.

An autonomous vehicle (also known as an unmanned vehicle) presents many new challenges above and beyond a non-autonomous vehicle. An autonomous vehicle may or may not have riders present within the vehicle while it is being driven. Therefore, many safety mechanisms need to be in place in the event of a mishap or hacked autonomous vehicle. In addition, many indicators should be present to signal or warn nearby vehicles d pedestrians of a particular status of an autonomous vehicle.

Several indicators currently exist solely for the purpose of informing nearby vehicles and pedestrians of the present status or upcoming status of a vehicle. For example, turn signals and brake lights serve no purpose to the driver or passengers of a vehicle. Instead, these features are for the purpose of informing nearby vehicles and pedestrians of an impending, turn, slow down, or stop of the vehicle.

Head lamps are designed to assist a driver of his/her surrounding environment so as to maintain safe and controlled driving of the vehicle during night time driving or other low visibility conditions. High beams of a head lamp are designed for this purpose. However, head lamps are also designed for drivers of other vehicles to identify an oncoming vehicle during night tune hours. Low beams of a head lamp allow an oncoming driver of another vehicle to identify the vehicle without being "blinded" by the high beams of the head lamp.

An autonomous vehicle may need one or more indicators to inform its surrounding traffic environment of its current status, in addition to current vehicle status indicators. This is of particular importance during period in which both non-autonomous and autonomous vehicles are present on the roadways. Autonomous indicators are in addition to the current status indicators of a vehicle, such as head and tail lamps, brake lamps, turn signals, emergency flashers, parking lamps, daytime running lamps, position lamps, license plate lamps, etc.

A primary objective of embodiments described herein is to identify a vehicle as an autonomous vehicle. An autonomous vehicle status indicator needs to transmit a signal to other vehicles and their drivers and to pedestrians. Therefore, an autonomous vehicle status indicator can be a plurality of separate indicators located around the autonomous vehicle. An autonomous vehicle status indicator can also be, a continuous indicator positioned about the entire periphery of the autonomous vehicle.

One or more optical fiber panels can be positioned on and integrated with a vehicle to be used as an autonomous vehicle status indicator. In one example, the one or more optical fiber panels can be applied as an applique to the surface of the vehicle. In a second example, the one or more optical fiber panels can be integrated into the panels of the vehicle. In either example, the one or more optical fiber panels blend in with the surrounding surfaces of the vehicle, such that they would not be visible when they are not activated.

Figure 2B:
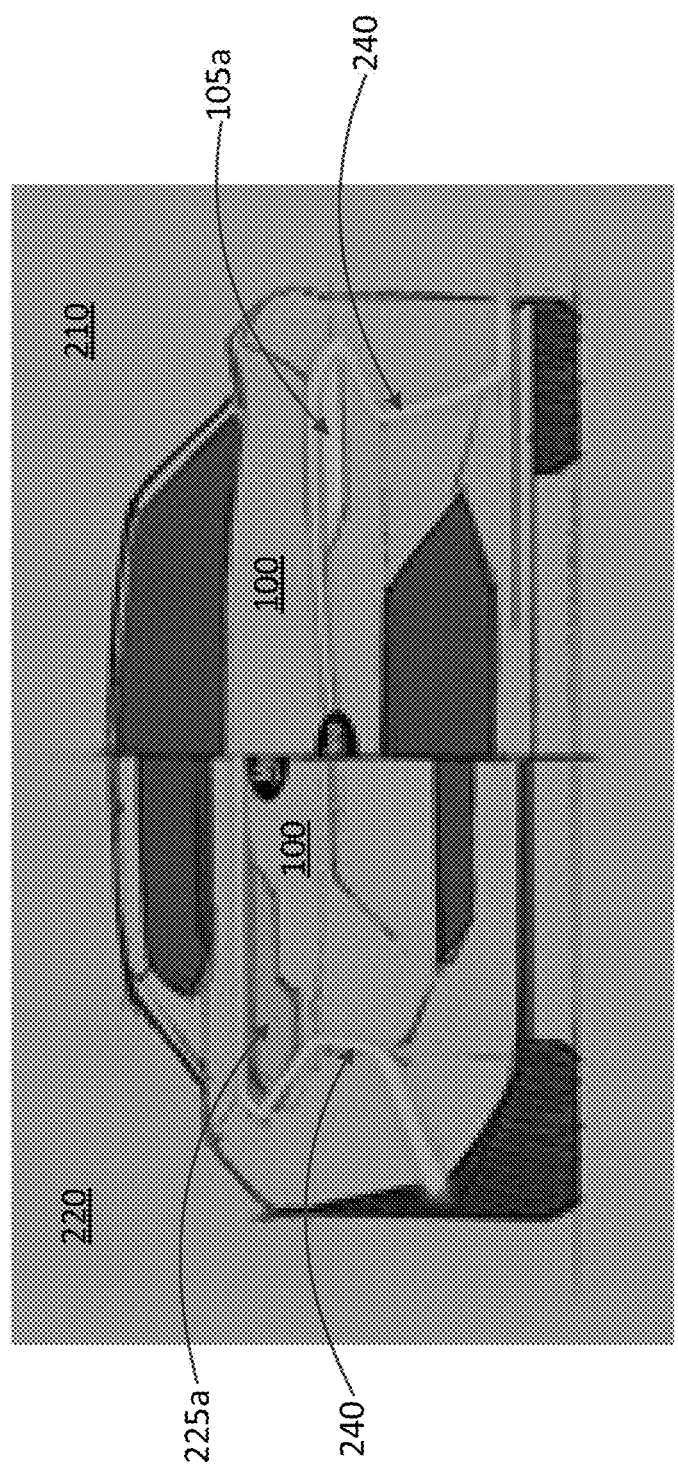
FIG. 2B illustrates an exemplary autonomous vehicle status indicator according to one embodiment.

FIG. 2B illustrates an exemplary autonomous vehicle status indicator 240. In the front end view 210, the autonomous vehicle status indicator 240 curves inward from the left front corner of vehicle 100 and curves around the left front headlamp 105a towards the front center of vehicle 100. The autonomous vehicle status indicator 240 would extend across the front end 210 of vehicle 100 and extend around the right headlamp 105b on the right front side of vehicle 100 in a symmetrical pattern with the left front side of vehicle 100. The autonomous vehicle status indicator 240 can also extend along the left side of vehicle 100 (not illustrated), either as a separate optical fiber panel or as a continuation of the front optical fiber panel illustrated in FIG. 2B.

In the back end view 220, the autonomous vehicle status indicator 240 curves inward from the left back corner of vehicle 100 and curves around the left tail lamp 225a towards the back center of vehicle 100. The autonomous vehicle status indicator 240 would extend across the back end 220 of vehicle 100 and extend around the right tail lamp 225b on the right back side of vehicle 100 in a symmetrical pattern with the left back side of vehicle 100. The autonomous vehicle status indicator 240 can also extend along the right side of vehicle 100 (not illustrated), either as a separate optical fiber panel or as a continuation of the back optical fiber panel illustrated in FIG. 2B.

FIG. 2B illustrates just one example in which the autonomous vehicle status indicator 240 can be implemented. Several different designs are contemplated by embodiments described herein, wherein designs can vary with a type of vehicle 100 and personal preferences. In addition, designs can vary as more vehicle standards are instituted.

The optical fiber panel(s) that makes up the autonomous vehicle status indicator 240 can be integrated into vehicle 100 as auxiliary lighting. The panels can be placed into a cavity that is stamped into a sheet metal or molded in the plastic to ensure the panel is flush. In one embodiment, an intensity level of the autonomous vehicle status indicator 240 could be approximately 100 kW. However, other intensity levels are contemplated by embodiments described herein, such as 4 cd to 400 cd. The autonomous vehicle status indicator 240 is not intended to replace onto be equivalent to headlamps or any other current function. The objective of the autonomous vehicle status indicator 240 is to provide the status of the autonomous vehicle at any time the autonomous vehicle is activated.

Multiple categories of autonomous vehicle status indicators are described herein. In a first category, the autonomous vehicle status indicators need to be configured to transmit a signal or message to human drivers of other vehicles and also transmit a signal or message to other autonomous, i.e. driverless vehicles. In a second category, the autonomous signal may be different during daytime hours and night time hours. In a third category, the autonomous signal may indicate an autonomous vehicle with passengers present within the vehicle and with no passengers present within the vehicle. In a fourth category, many alert statuses are present to indicate a possible malfunction or an emergency situation with the autonomous vehicle.

Autonomous vehicle status indicators intended for human drivers of other vehicles or pedestrians need to be received by one or more sensory perception receptors for the message or alert to have any meaning to a human driver or pedestrian. Therefore, a visual indicator needs to vary with size, shape, color, or pattern of the light signal. In addition, the human driver or pedestrian needs to have an accepted meaning associated with each message or alert.

In contrast, an autonomous vehicle can receive a message or alert from another autonomous vehicle via an electrical signal. A transmitted electrical signal from one autonomous vehicle to one or more other autonomous vehicles has much greater latitude in the specific message being sent. In addition, an electrical signal can be directly transmitted and received much faster than human sensory perception allows.

An autonomous vehicle can be configured to automatically transmit an electrical signal for any status indicator to any other autonomous vehicles that might be present within the signal transmission range. The transmitted signal can be configured to transmit a predetermined radial distance in which other autonomous vehicles might be affected by a particular status of the autonomous vehicle. For example, a status signal can be radially transmitted within 100 feet when the autonomous vehicle is travelling at slower speeds, such as city traffic. The status signal can be radially transmitted within 200-300 feet when the autonomous vehicle is travelling at faster speeds, such as highway traffic. The status signal at higher speeds can be further configured to primarily transmit in a forward and backward direction, but transmit a minimal amount in a sideways direction since any receiving autonomous vehicles or drivers will be within a short sideways distance relative to the autonomous vehicle.

It may be desirable for an autonomous vehicle status indicator to transmit one type of indicator during daytime hours and a second type of indicator during night time hours. A third type of indicator can also be used for dawn and dusk hours. This indicator is configured to inform surrounding drivers and pedestrians of the presence of an active autonomous vehicle.

A daytime status indicator (absent any other alert indicators) can be a light or medium intensity illumination to alert drivers and pedestrians of an active autonomous vehicle. The illumination can provide a glow around the perimeter of the autonomous vehicle. There may be passengers within the autonomous vehicle, but a human is not controlling the autonomous vehicle. A predetermined color or colors that are fit for a daytime status indicator can be used in addition to or in lieu of a predetermined intensity illumination. For example, a yellow, orange, or red horizon color can be used.

A night time status indicator (absent any other alert indicators) can be a medium intensity illumination to alert drivers of oncoming vehicles of an active autonomous vehicle. The night time status indicator needs to fulfill requirements for night time lamp illumination. In addition, the night time status indicator can provide illumination of the vehicle's surroundings for the benefit of any passengers. The night time illumination does not need to be as intense as is needed for a driver of a vehicle. Instead, it can simply provide enough illumination to partially or completely identify items within the immediate vicinity of the autonomous vehicle.

The night time status indicator can also be configured to identify oncoming illumination and in response, activate the night time status indicator to a level required for a head lamp. The activated night time status indicator can be in response to an oncoming vehicle, and it can also be in response to other illumination that is either approaching the autonomous vehicle or illumination that is being approached by the autonomous vehicle. Other illumination includes, but is not limited to street or highway lights, a traffic signal, emergency vehicle lighting, or warning flashers from a parked or moving vehicle.

Dawn or dusk status indicators can include an illumination greater than a daytime illumination, but less than a night time illumination. In addition, a predetermined color or colors in tune with dawn or dusk conditions cats be used. For example, a medium shade of yellow, orange, blue, or great can be used to indicate a dawn or dusk status of the autonomous vehicle.

A vehicle occupancy status indicator transmits a message signal regarding the presence of passengers within the autonomous vehicle. An illumination combination of light intensity, color, and/or pattern can be used for the transmitted indicator. In one example, a higher intensity, bolder color, or active pattern may be desired when no passengers are present. This may be desirable in the event a possible malfunction or dangerous situation exists, which could alert other drivers or pedestrians to report such an incident.

In a second example, medium illumination intensity color, and/or pattern may be desired to alert surrounding drivers and pedestrians that passengers are present within the autonomous vehicle, but a person is not controlling the autonomous vehicle. This may be desirable to avoid fears or tensions from surrounding drivers or pedestrians that the vehicle is out of control. In a situation in which the autonomous vehicle has malfunctioned, the passenger occupancy status indicator can raise attention to surrounding drivers or pedestrians that assistance might be needed for the passengers of the autonomous vehicle.

Many autonomous vehicle alert status indicators can be used to indicate a possible malfunction or an emergency situation with the autonomous vehicle. One or more optical fiber panels can use multiple colors to indicate specific alerts. Colors that tend to be less bold or loud can be used for less severe messages, while bold or loud colors can be used for more serious messages. Some examples are given for illustrative purposes only.

Pastel colors, i.e. lighter shades can be used for minor malfunctions, such as malfunctions to interior controls, lighting, temperature, and entertainment centers. Medium tone colors can be used for malfunctions of a moderate nature, such as possible electrical signaling malfunctions or non-emergency mechanical malfunctions. Bold color tones can be used for severe malfunctions, such as emergency mechanical or programming malfunctions. Many different color schemes are contemplated by embodiments described herein and can depend in part on design parameters and personal preferences.

Other autonomous vehicle status indicators can be used in addition to or in lieu of color signaling of the optical fiber panels. For example, a slow peed streaming illumination of the optical fiber panels can be used for mild or non-severe malfunctions. A faster speed streaming illumination of the optical fiber panels can be used for moderate non-emergency malfunctions. A fast streaming or flashing illumination of the optical fiber panels can be used for severe emergency malfunctions.

Multiple illumination geometries, such as squares, triangles, octagons, diamonds, and circles can also be used in addition to or in lieu of other alert illuminations described herein. The geometrical shapes can be used to coincide with conventional sign shapes currently used on roadways. For example, an octagon shape could indicate the autonomous vehicle is stopping, or an upside-down triangle shape could indicate the autonomous vehicle is yielding to pedestrians or other vehicles. Geometrical illumination indicator alerts can be advantageous for color-impaired drivers and pedestrians.

A manual operation status indicator for an autonomous vehicle can be configured to indicate that the autonomous vehicle is under the manual control of a human driver rather than automated control. This may be desirable when the autonomous vehicle is recognized by the surrounding drivers and pedestrians as an autonomous vehicle and is therefore assumed to be under automated control. The manual operation status indicator can alert the surrounding drivers and pedestrians that the autonomous vehicle is under manual control. The manual operation status indicator can simply be the absence of other automated status controls, or it can be a predetermined combination of one or more visual or audio signals.

FIG. 3 illustrates an autonomous vehicle status algorithm 300. In step 305, the autonomous vehicle is activated. This can be achieved manually and directly, such as using a key or push button engine start. It can also be achieved manually, but remotely. It can also be achieved via a controller in response to receiving a transmitted message with regard to the autonomous vehicle.

In step 310, it is determined whether the autonomous vehicle will be operated manually. If the autonomous vehicle is operated manually (a "YES" decision at step 310), the decision loop continues as long as the autonomous vehicle is being manually operated. In one embodiment, the loop can be suspended until a change is implemented, which resumes the decision loop at step 310. If the autonomous vehicle is not operated manually (a "NO" decision at step 310), the process continues to step 315.

In step 315, it is determined whether the autonomous vehicle is inactivated. If the autonomous vehicle is inactivated (a "YES" decision at step 315), the process ends. In the previous example in which the autonomous vehicle is being manually operated, the process ends when the autonomous vehicle is turned off, either manually or automatically. If the autonomous vehicle is not inactivated (a "NO" decision at step 315), the process continues to step 320.

In step 320, it is determined whether the autonomous vehicle is being operated during daytime hours. If the autonomous vehicle is being operated during daytime hours (a "YES" decision at step 320), the process continues to step 325.

In step 325, a daytime status indicator is transmitted. The signal transmission activates the one or more optical fiber panels located about the perimeter of the autonomous vehicle. For example, a yellow, orange, or red horizon color can be used to indicate daytime hours in which solar illumination is present. A daytime status activation of the one or more optical fiber panels can be in addition to or in lieu of a daytime running lamp. If the autonomous vehicle is not being operated during daytime hours (a "NO" decision at step 320), the process continues to step 330.

In step 330, it is determined whether the autonomous vehicle is being operated during dusk or dawn hours. If the autonomous vehicle is being operated during dusk or dawn hours (a "YES" decision at step 330), the process continues to step 335.

In step 335, a dusk/dawn status indicator is transmitted. The signal transmission activates the one or more optical fiber panels located about the perimeter of the autonomous vehicle. For example, a medium shade of yellow, orange, blue, or green can be used to indicate a dawn or dusk status of the autonomous vehicle. If the autonomous vehicle is not being operated during dusk or dawn hours (a "NO" decision at step 330), the process continues to step 340.

In step 340, it is determined whether the autonomous vehicle is being operated during night time hours. If the autonomous vehicle is being operated during night time hours (a "YES" decision at step 340), the process continues to step 345.

In step 345, a night time status indicator is transmitted. The signal transmission activates the one or more optical fiber panels located about the perimeter of the autonomous vehicle. For example, a night time status indicator can be a medium intensity illumination to alert drivers of oncoming vehicles of an active autonomous vehicle.

After a daytime, dawn/dusk, or night time status indicator has been transmitted, the process continues to step 350. In step 350, it is determined whether the autonomous vehicle is occupied. In one embodiment, this can be determined by pressure sensors located within the autonomous vehicle.

If the autonomous vehicle is occupied (a "YES" decision in step 350), the process proceeds to step 355. In step 355, a passenger occupancy status indicator is transmitted. In a first embodiment, a medium illumination intensity, color, and/or pattern may be desired to alert surrounding drivers and pedestrians that passengers are present within the autonomous vehicle, but a person is not controlling the autonomous vehicle. This may be desirable to avoid fears or tensions from surrounding drivers or pedestrians that the vehicle is out of control. In a second embodiment, a generic profile image or a stick figure image can be illuminated. If the autonomous vehicle is not occupied (a "NO" decision in step 350), the process continues to step 360.

In step 360, an unoccupied passenger status indicator is transmitted. In one embodiment, a higher intensity, bolder color, or active pattern may be desired when no passengers are present. This may be desirable in the event a possible malfunction or dangerous situation exists, which could alert other drivers or pedestrians to report such an incident. In a second embodiment, an image of a processor can be illuminated to indicate there are no passengers in the autonomous vehicle. In a third embodiment, there may be an absence of a passenger indicator.

After a passenger occupied or passenger unoccupied status indicator has been transmitted, the process continues to step 365. In step 365, it is determined whether a minor malfunction is present. Minor malfunctions include, but are not limited to malfunctions of interior controls, lighting, temperature, and entertainment centers. If a minor malfunction is present (a "YES" decision in step 365), the process continues to step 370.

Figure 4A:
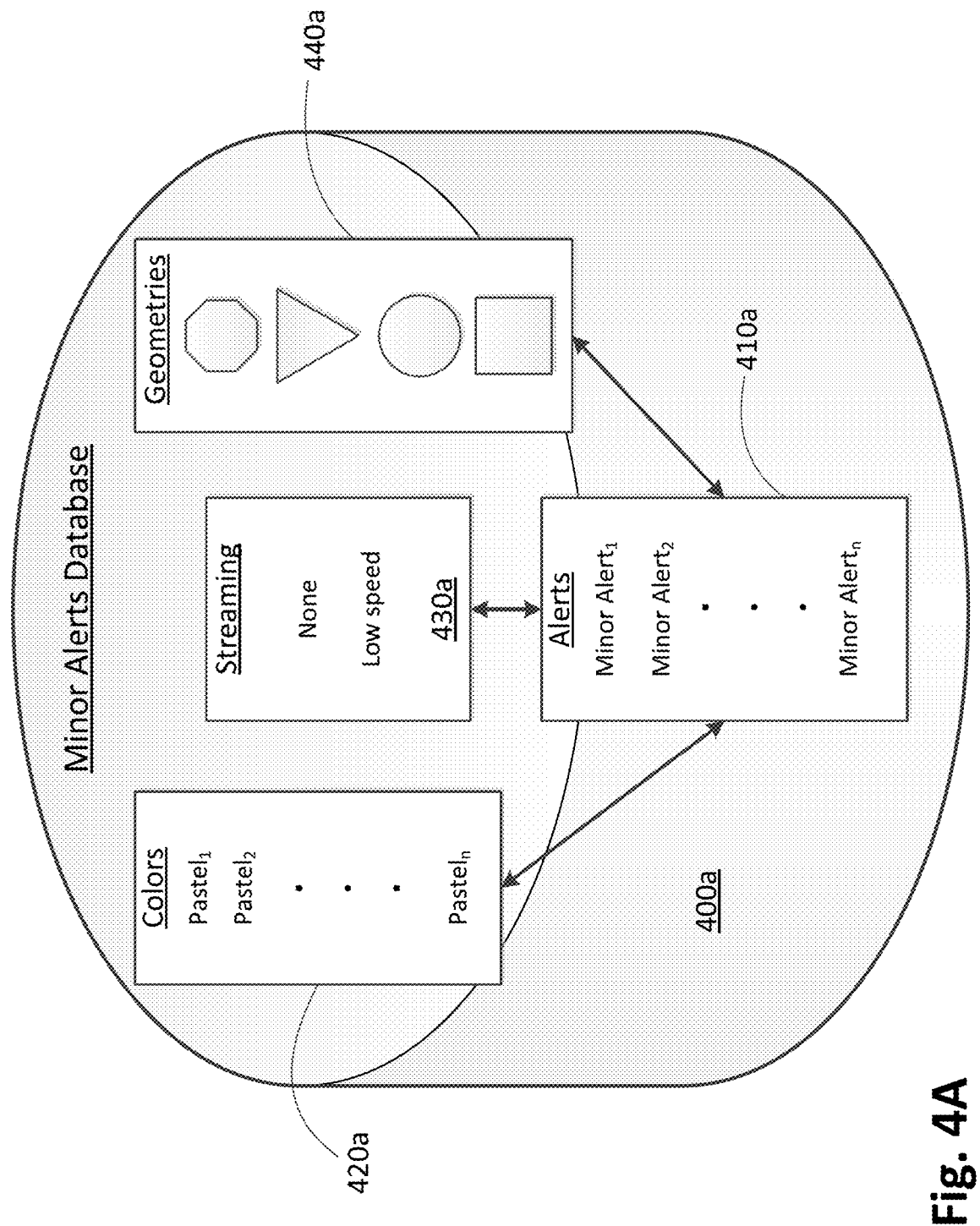
FIG. 4A illustrates a minor alerts database according to one embodiment.

In step 370, a minor malfunction status indicator is transmitted. FIG. 4A illustrates a minor alerts database 400a used in conjunction with transmitting a minor malfunction status indicator. An alert module 410a includes various minor alerts, such as a fan or blower malfunction, a dome light malfunction, an interior or exterior temperature malfunction, or an audio entertainment malfunction. Each minor alert is associated with a specific color from a color module 420a, a specific streaming function from a streaming module 430a, and/or a specific geometrical shape display from a geometry module 440a. In an example given for illustrative purposes only, a temperature malfunction can be linked to a green pastel color from the color module 420a, no streaming feature from the streaming module 430a, and a square geometrical shape from the geometry module 440a. Many other illumination combinations of colors, streaming, and geometrical shapes for a particular minor alert are contemplated by embodiments described herein. In addition, a particular minor alert may be associated with just one or two modules from the color module 420a, the streaming module 430a, and the geometry module 440a.

If a minor malfunction is not present (a "NO" decision in step 365), the process continues to step 375. In step 375, it is determined whether a moderate malfunction is present. Moderate malfunctions include, but are not limited to electrical signaling malfunctions and non-emergency mechanical malfunctions. Moderate malfunctions can be determined via an onboard diagnostic module that is configured to monitor a plurality of malfunctions across multiple vehicle systems. If a moderate malfunction is present (a "YES" decision in step 375), the process continues to step 380.

Figure 4B:
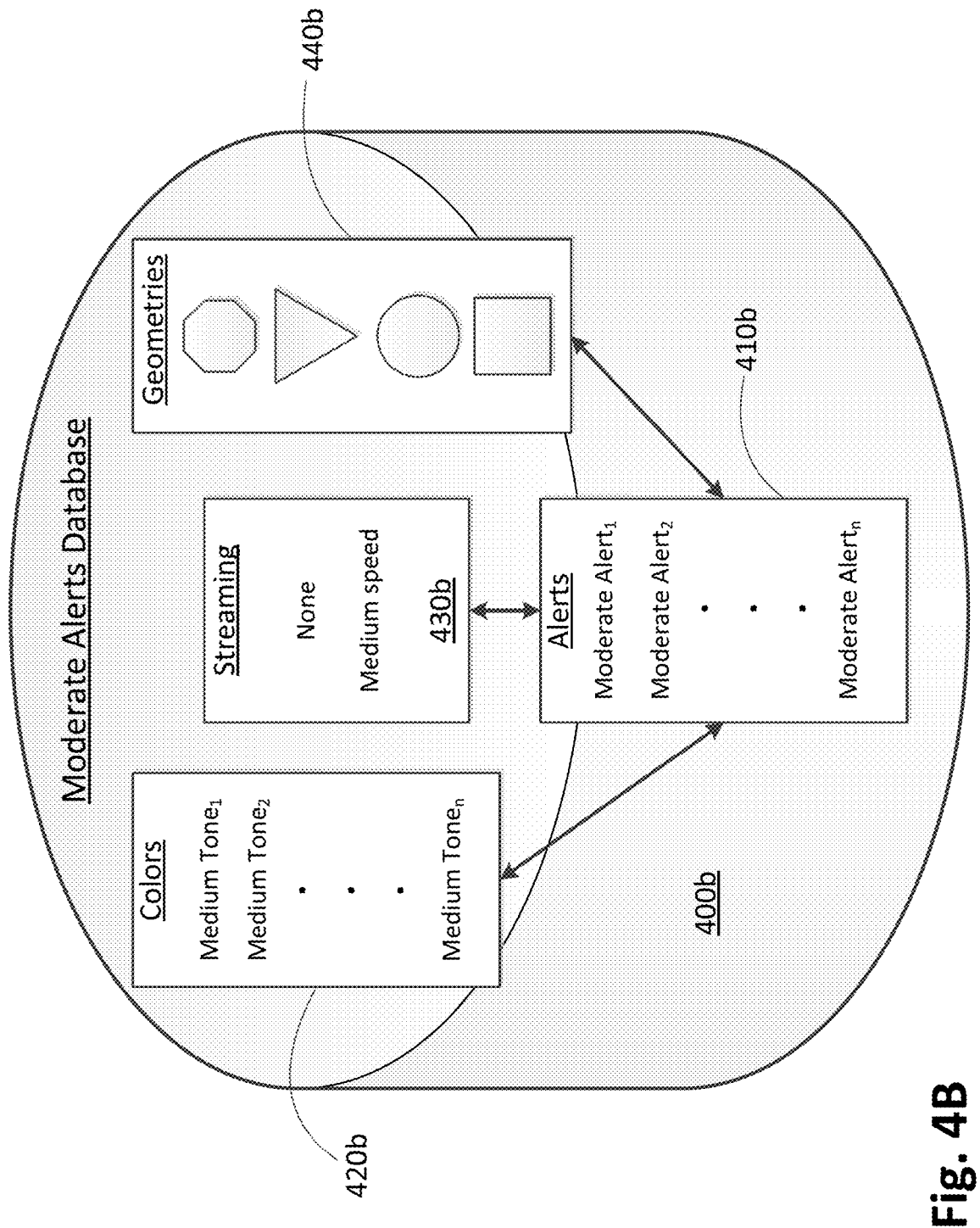
FIG. 4B illustrates a moderate alerts database according to one embodiment.

In step 380, a moderate malfunction status indicator is transmitted. FIG. 4B illustrates a moderate alerts database 400b used in conjunction with transmitting a moderate malfunction status indicator. An alert module 410b includes various moderate alerts, such as a turn signal malfunction, a low tire pressure indication, an out of range gauge reading for water temperature, battery voltage, or oil pressure, or a windshield wiper malfunction. Each moderate alert is associated with a specific color from a color module 420b, a specific streaming function from a streaming module 430b, and/or a specific geometrical shape display from a geometry module 440b. In an example given for illustrative purposes only, a turn signal malfunction can be linked to a medium tone green color from the color module 420b, a medium speed streaming feature from the streaming module 430b, and a circle geometrical shape from the geometry module 440b. Many other illumination combinations of colors, streaming, and geometrical shapes for a particular moderate alert are contemplated by embodiments described herein. In addition, a particular moderate alert may be associated with just one or two modules from the color module 420b, the streaming module 430b, and the geometry module 440b.

If a moderate malfunction is not present (a "NO" decision in step 375), the process continues to step 385. In step 385, it is determined whether a severe malfunction is present. Severe malfunctions include, but are not limited to emergency mechanical or programming malfunctions. Severe malfunctions can be determined via an onboard diagnostic module that is configured to monitor a plurality of malfunctions across multiple vehicle systems. If a severe malfunction is present (a "YES" decision in step 385), the process continues to step 390.

Figure 4C:
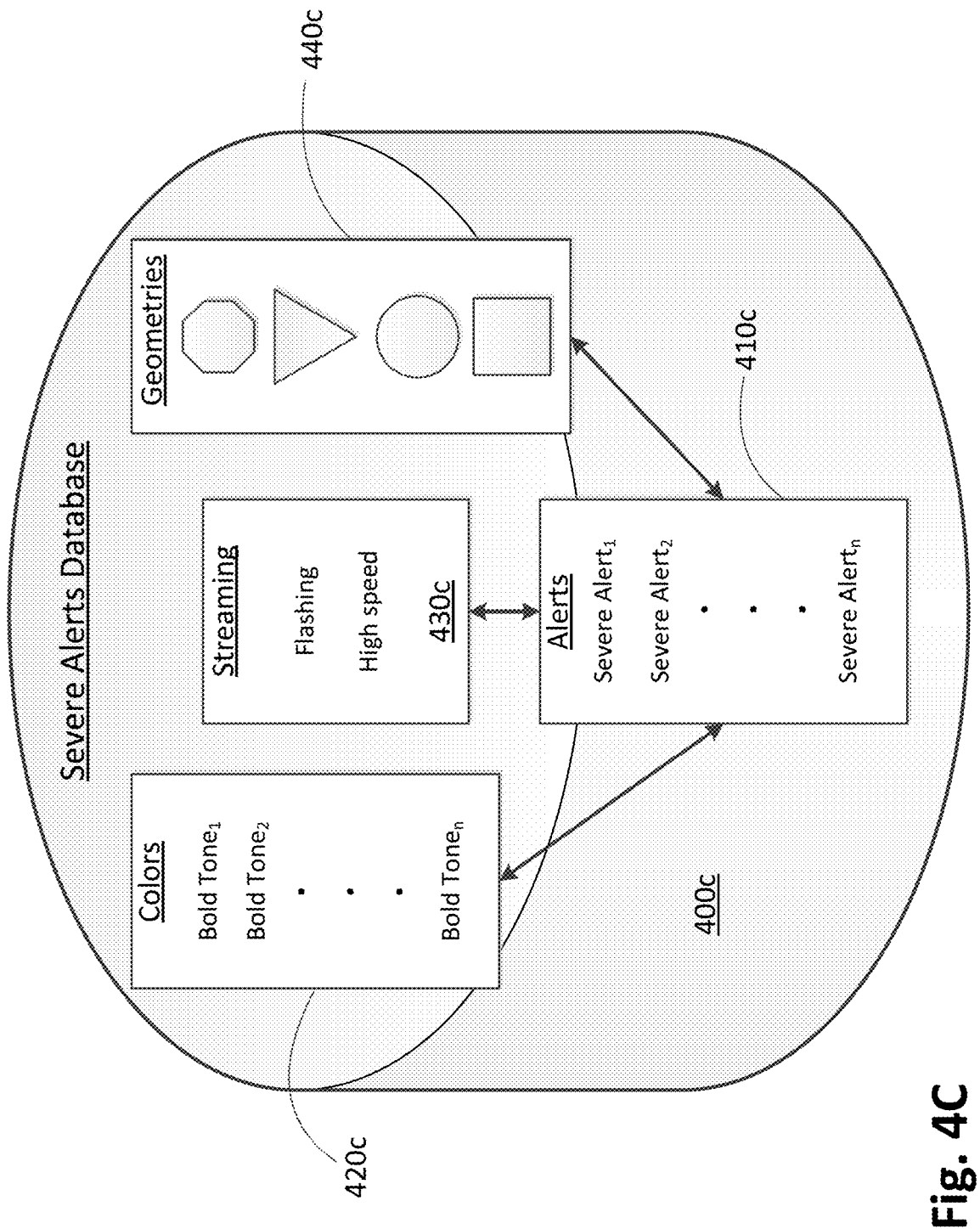
FIG. 4C illustrates a severe alerts database according, to one embodiment.

In step 390, a severe malfunction status indicator is transmitted. FIG. 4C illustrates a severe alerts database 400c used in conjunction with transmitting a severe malfunction status indicator. An alert module 410c includes various severe alerts, such as a flat tire, extreme gauge indicators for temperature, battery charge, and oil pressure, smoke or steam coming from the engine region, cessation of the engine, or a collision with another vehicle. Each severe alert is associated with a specific color from a color module 420c, a specific streaming function from a streaming module 430c, and/or a specific geometrical shape display from a geometry module 440c. In an example given for illustrative purposes only, a flat tire malfunction can be linked to a bold or bright green color from the color module 420c, a high speed streaming feature from the streaming module 430c, and an upside down triangular geometrical shape from the geometry module 440c. Many other illumination combinations of colors, streaming, and geometrical shapes for a particular severe alert are contemplated by embodiments described herein. In addition, a particular severe alert may be associated with just one or two modules from the color module 420c, the streaming module 430c, and the geometry module 440c.

If there are no minor, moderate, or severe malfunctions present (a "NO" decision in step 385), the process continues to step 395. In step 395, it is determined whether the autonomous vehicle is inactivated. If the autonomous vehicle is inactivated (a "YES" decision in step 395), the process ends. If the autonomous vehicle is not inactivated (a "NO" decision in step 395), the process returns to step 310 to continue monitoring the status f the autonomous vehicle.

In the autonomous vehicle status algorithm 300, one or more types of status indicators may always be illuminated when the autonomous vehicle is activated. For example, one of the time-of-day activations (daytime 320, dusk or dawn 330, or night time 340) will be activated, unless deactivated for some reason. One of the passenger occupancy indicators (occupied 355 or unoccupied 360) will be activated, unless deactivated for some reason. Therefore, it may be desirable to have more than one optical fiber panel or more than one set of optical fiber panels. In one embodiment, a first dedicated optical fiber panel can be used for the time-of-day status activations, a second dedicated optical fiber panel can be used for the passenger occupancy status indicators, and a third optical fiber panel can be used for all other types of status indicators. In a second embodiment, each type of status indicator can have its own dedicated optical fiber panel. In a third embodiment, one or two optical fiber panels can be used for all types of status indicators n as priority basis. For example, a severe malfunction status indicator would have priority over a daytime time-of-day indicator.

Each of the status indicators in the autonomous vehicle status algorithm 300 have been described with respect to providing a status indicator that case be received by humans, i.e. some type of optical illumination such as color, streaming or flashing, and geometrical shape. In one embodiment, each of the decisions made in steps 310, 315, 320, 330, 340, 350, 365, 375, 385, and 395 can also include transmitting an electrical signal representing the decisions made to any receiving autonomous vehicles within range of the transmission. For example, a status signal can be radially transmitted within 100 feet when the autonomous vehicle is travelling at slower speeds, such as city traffic. The status signal can be radially transmitted within 200-300 feet when the autonomous vehicle is travelling at faster speeds, such as highway traffic. The status signal at higher speeds can be further configured to primarily transmit in a forward and backward direction, but transmit a minimal amount in a sideways direction since any receiving autonomous vehicles or drivers will be within a short sideways distance relative to the autonomous vehicle.

The autonomous vehicle status algorithm 300 is not limited to the status indicators illustrated in FIG. 3 for time-of-day, passenger occupancy, and malfunction status indicators. These have been presented as illustrative only. Other types of status indicators far an autonomous vehicle are contemplated by embodiments described herein.

Figure 5:
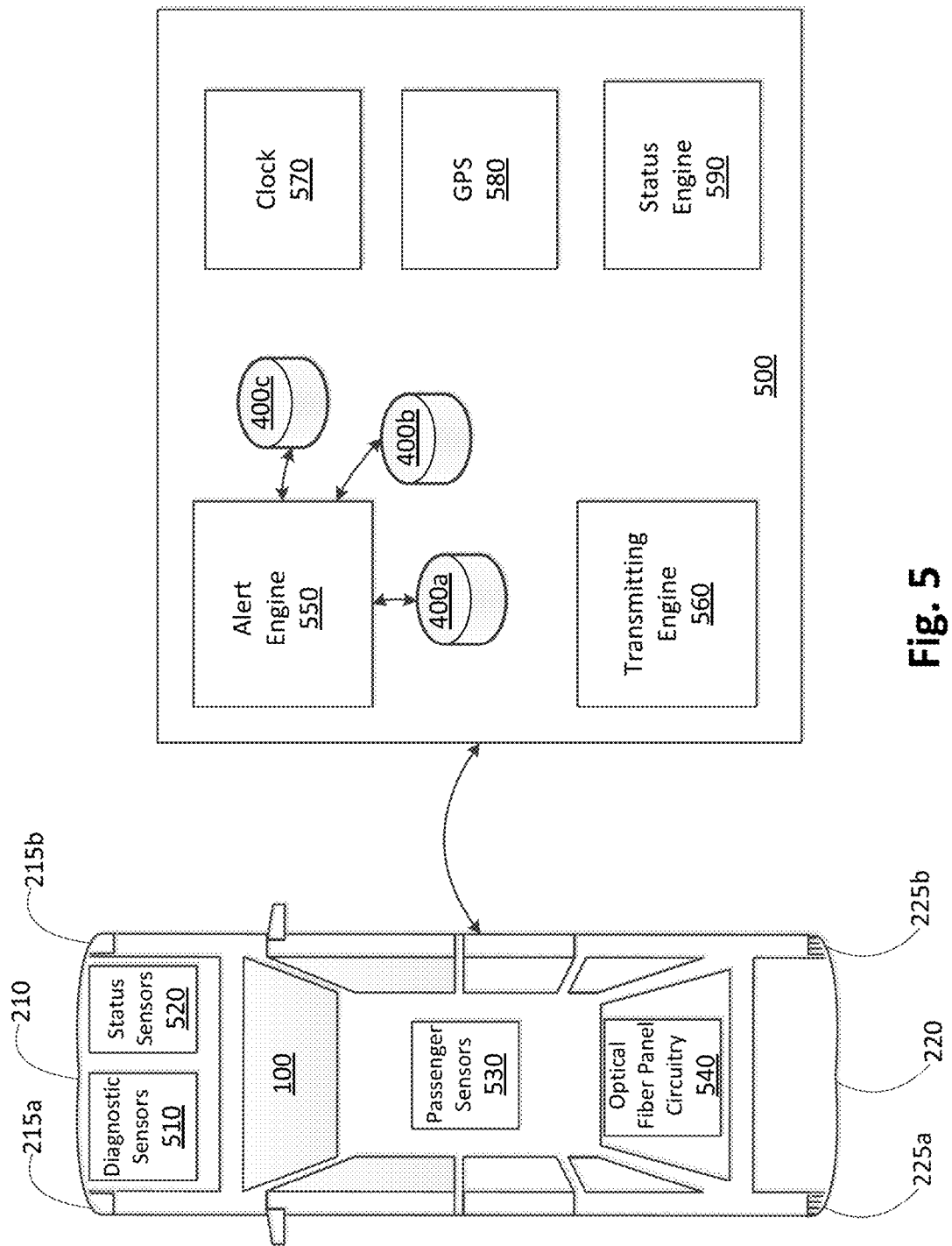
FIG. 5 is a block diagram of an autonomous vehicle and an associated status indication controller according to one embodiment.

FIG. 5 is a block diagram of an autonomous vehicle 100 and an associated status indication controller 500. Autonomous vehicle 100 includes several sensors and processing circuitry that are used in conjunction with the status indication controller 500 by which embodiments described herein are executed.

Autonomous vehicle 100 includes a plurality of diagnostic sensors 510. In one embodiment, onboard diagnostic module is configured with sensors, such as fluid level sensors, temperature sensors, and pressure sensors.

Autonomous vehicle 100 also includes a plurality of status sensors 520. Status sensors 520 include, but are not limited to a vehicle activation sensor, a movement sensor, and a manual or automated operation sensor.

A plurality of passenger sensors 530 determine whether one or more passengers are in the autonomous vehicle 100. In one embodiment, pressure sensors are positioned within each seat of the vehicle interior. When an individual is seated, the respective pressure sensor is activated to indicate the presence of the individual.

Autonomous vehicle 100 also includes optical fiber panel circuitry 540 that is connected to the one or more optical fiber panels positioned around the perimeter of the autonomous vehicle 100. The optical finer panel circuitry 540 receives transmitted signals from the status indication controller 500. In response, the optical fiber panel circuitry 540 activates the one or more optical fiber panels to illuminate in a predetermined pattern according to the transmitted signals.

The status indication controller 500 includes an alert engine 550 that is configured with circuitry to determine a particular alert to be activated with the autonomous vehicle 100. Data from one or more of the diagnostic sensors 510, the status sensors 520, and the passenger sensors 530 are retrieved from the autonomous vehicle 100 by the alert engine 550. An analysis of the received data is made to determine a particular alert message to be activated, via the autonomous vehicle status indicator 240 of the autonomous vehicle 100. The alert engine 550 works in conjunction with the minor alerts database 400a, the moderate alerts database 400b, and the severe alerts database 400c to determine the alert message to be activated.

The status indication controller 500 also includes a transmitting engine 560. When the alert message is determined by the alert engine 550, the digital alert message is transmitted by the transmitting engine 560 to the autonomous vehicle 100 for illuminated display, via the autonomous vehicle status indicator 240.

The status indication controller 500 also includes a clock 570, which is used to provide a time of day. The clock 570 works in conjunction with a Guidance Positioning System (GPS) 580 to provide a location of the autonomous vehicle 100. The status indication controller 500 also includes a status engine 590, which is configured with circuitry to determine a particular status of the autonomous vehicle 100, via the status sensors 520. For example, the status sensors 520 are configured in part to determine a time of day status, along with data from the clock 570 and the GPS 580. A particular status determined by the status engine 590 is transmitted to the autonomous vehicle 100, via the transmitting engine 560.

FIG. 5 illustrates the status indication controller 500 as being separate from the autonomous vehicle 100 in one embodiment. However, the status indication controller 500 can also be onboard the autonomous vehicle 100 in a second embodiment. In a third embodiment, functions of the status indication controller 500 can be configured as part of a cloud service.

Each of the functions of the described embodiments can be implemented by one or more processing circuits. A processing circuit includes a programmed processor, which includes circuitry. A processing circuit/circuitry can also include devices such as an application specific integrated circuit (ASIC) and circuit components arranged to perform the recited functions. The processing circuitry can be referred to interchangeably as circuitry throughout the disclosure.

In addition, when processors are programmed to perform the processes described herein, they become special-purpose devices. The processes performed by the controller 500 has specialized processing circuitry. The status indication controller 500 can be an individual server as illustrated in FIG. 5 or it can be separated into multiple servers that run in parallel.

Figure 6:
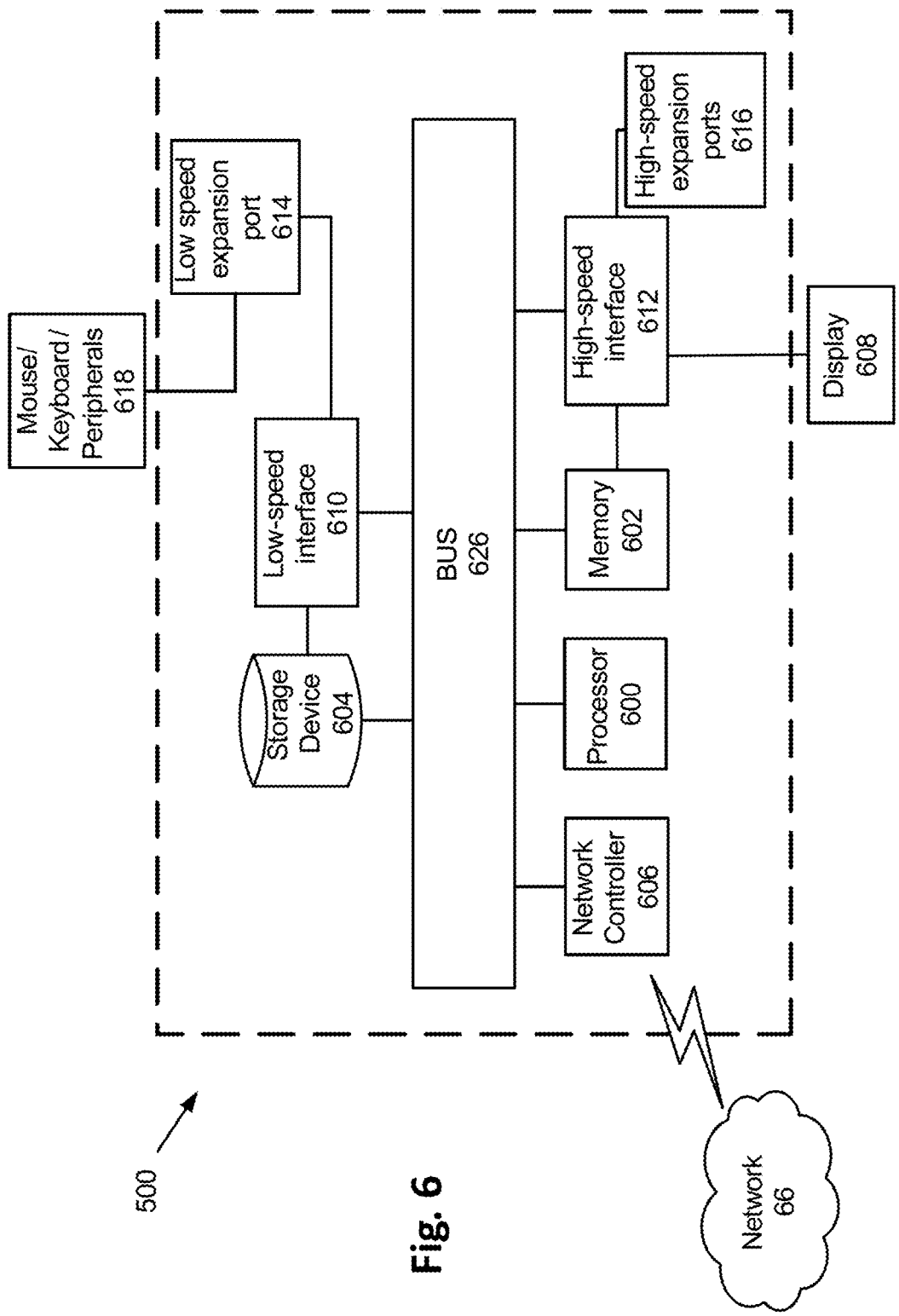
FIG. 6 is a schematic of an exemplary controller according to one embodiment.

FIG. 6 is a schematic of an exemplary controller, such as status indication controller 500 used to implement the techniques described in this disclosure. The status indication controller 500 is intended to represent various forms of digital hardware, such as laptops, desktops, workstations, personal digital assistants, servers, blade servers, mainframes, and other appropriate computers. The components shown here, their connections and relationships, and their functions are meant to be examples only and are not meant to be limiting.

The status indication controller 500 includes a processor 600, a memory 602, a storage device 604, a high-speed interface 612 connecting to the memory 602 and multiple high-speed expansion ports 616, and a low-speed interface 610 connecting to a low-speed expansion port 614 and the storage device 604. Each of the processor 600, the memory 602) the storage device 604, the high-speed interface 612, the high-speed expansion ports 616, and the low-speed interface 610 are interconnected using various busses, such as communication bus 626, and may be mounted on a common motherboard or in other manners as appropriate.

The processor 600 can process instructions for execution within the status indication controller 500, including instructions stored in the memory 602 or on the storage device 604 to display graphical information for a GUI on an, external input/output device, such as a display 608 coupled to the high-speed interface 612. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). The memory 602 stores information within the status indication controller 500. In some implementations, the memory 602 is a volatile memory unit or units. In some implementations, the memory 602 is a non-volatile memory unit or units. The memory 602 can also be another form of computer-readable medium, such as a magnetic or optical disk.

The storage device 604 is capable of providing mass storage for the status indication controller 500. In some implementations, the storage device 604 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processor 600), perform one or more methods, such as those described above. The instructions can also be stored by one or more storage devices, such as computer- or machine-readable mediums (for example, the memory 602, the storage device 604, or memory on the processor 600).

The high-speed interface 612 manages bandwidth-intensive operations for the status indication controller 500, while the low-speed interface 610 manages lower bandwidth-intensive operations. Such allocation of functions is, an example only. In some implementations, the high-speed interface 612 is coupled to the memory 602, the display 608 (e.g., through a graphics processor or accelerator), and to the high-speed expansion pons 616, which may accept various expansion cards (not shown). In the implementation, the low-speed interface 610 is coupled to the storage device 604 and the low-speed expansion port 614. The low-speed expansion port 614, which can include various communication ports (e.g., USB, Bluetooth, Ethernet, wireless Ethernet) can be coupled to one or mere; input/output devices 618, such as a keyboard, a pointing device, a scanner, or a networking device such as a switch or router, e.g., through a network adapter.

The status indication controller 500 also includes a network controller 606, such as an Intel Ethernet PRO network interface card from Intel Corporation of America, for interfacing with a network 66. As can be appreciated, the network 66 can be a public network, such as the Internet, or a private network such as an LAN or WAN network, or any combination thereof and can also include PSTN or ISDN sub-networks. The network 66 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Although the status indication controller 500 of FIG. 6 is described as having a storage medium device 604, the claimed advancements are not limited by the form of the computer-readable media on which the instructions of the described processes are stored. For example, the instructions can be stored on CDs, DVDs, in FLASH memory, RAM, ROM, PROM, EPROM, EEPROM, hard disk, or any other information processing device with which the computing device communicates.

In other alternate embodiments, processing features according to the present disclosure may be implemented and commercialized as hardware, a software solution, or a combination thereof. Moreover, instructions corresponding to processes described herein could be stored in a portable drive, such as a USB Flash drive that hosts a secure process.

Computer programs (also known as programs, software, software applications, or code) associated with the processes described herein include machine instructions for a programmable processor, and can be implemented in a high-level procedural and/or object-oriented programming language, and/or in assembly machine language. As used herein, the terms machine-readable medium and computer-readable medium refer to any computer program product, apparatus, and/or device (e.g., magnetic discs, optical disks, memory. Programmable Logic Devices (PLDs)) used to provide machine instructions and/or data to a programmable processor, including a machine-readable medium that receives machine instructions as a machine-readable signal.

The term machine-readable signal refers to any signal used to provide machine instructions and/or data to a programmable processor.

To provide for interaction with a user, the systems and techniques described herein can be implemented on a computer having a display device 608 (e.g., a CRT (cathode ray tube) or LCD (liquid crystal display) monitor) for displaying information to the user and a keyboard and a pointing device 618 (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interlace or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed tin modules or hardware not identical to those described. Accordingly, other implementations are within the scope that may be claimed.

Embodiments described herein can be implemented in conjunction with one or more of the devices described above with reference to FIG. 6. Embodiments are a combination of hardware and software, and processing circuitry by which the software is implemented.

Figure 7:
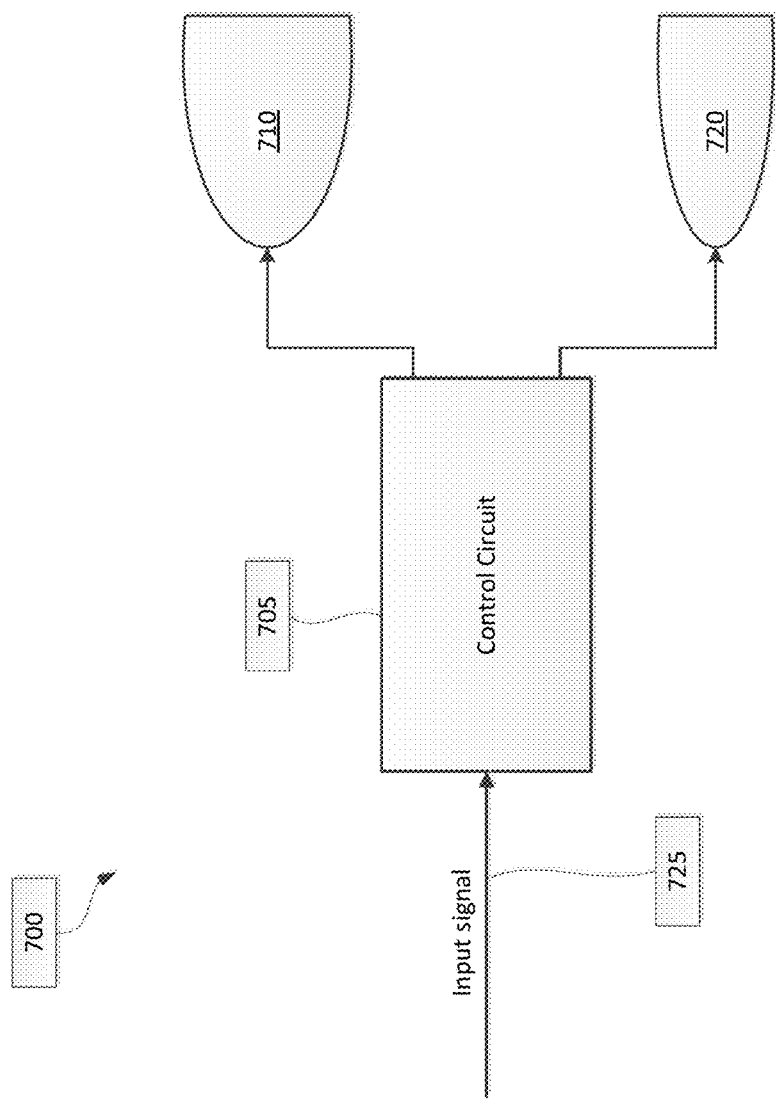
FIG. 7 illustrates a functional block diagram of a vehicle lamp assembly according to one embodiment.

FIG. 7 illustrates a functional block diagram of a vehicle lamp assembly 700 of vehicle 100, such as headlamp assemblies 105a and 105b and tail lamps 225a and 225b. Vehicle lamp assembly 700 includes a control circuit 705 and a solid state light source module 710. One or more optional light source modules 720 include additional solid state light source modules and/or a laser light source a module. An input signal 725 is connected to the control circuit 705. The input signal 725 can be a switch to initiate or close power to one or more of the solid state light source module 710 and the optional light source module(s) 720. Other types of input signals 725 are contemplated by embodiments described herein.

It should be noted that while FIG. 7 illustrates control circuit 705 as included within vehicle lamp assembly 700, control circuit 705 could also be located apart from vehicle lamp assembly 700. Moreover, a single control circuit 705 can be employed for both a right and left vehicle lamp assembly such that the solid state light source module 710 and the optional light source module(s) 720 are driven in a synchronized manner.

Embodiments described herein provide, several advantages. The autonomous vehicle status indicator 240 provides customized illumination formats to inform drivers of surrounding vehicles and nearby pedestrians of one or more statuses of the autonomous vehicle. In addition, electrical signals representing the one or more statuses are transmitted to surrounding autonomous vehicles.

The autonomous vehicle status indicator 240 works in conjunction with existing lamp modules of a vehicle. This provides a vehicle with both autonomous and non-autonomous functions when both autonomous and non-autonomous vehicles are sharing the roadways.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A lighting system for an autonomous vehicle, comprising:
   a plurality of lamps positioned along a perimeter of the autonomous vehicle;
   a plurality of optical fiber panels positioned along the perimeter of the autonomous vehicle and bundled together along the perimeter of the autonomous vehicle, at least one of the optical fiber panels extending around at least a part of a periphery of one of the plurality of lamps; and
   a processing circuitry configured to activate the optical fiber panels in a predetermined illumination in response to a status of the autonomous vehicle, wherein the status includes one or more of a time of day, a number of passengers occupied within the autonomous vehicle, and an alert status during operation of the autonomous vehicle, wherein the alert status includes a malfunction status of the autonomous vehicle, wherein the processing circuitry is further configured to transmit an electrical signal representative of the status to one or more surrounding autonomous vehicles, wherein the optical fiber panels are configured to illuminate in a plurality of colors, a plurality of streaming rates, and a plurality of geometries, wherein at least one optical fiber panel is dedicated for a predetermined status, and wherein said at least one optical fiber panel is configured to be activated according to a priority of statuses.

2. The lighting system of claim 1, wherein the status is determined via sensor data and status data received from the autonomous vehicle.

3. The lighting system of claim 1, wherein the lamps include head lamps, tail lamps, brake lamps, or signal lamps.

4. The lighting system of claim 1, wherein the optical fiber panels are configured to be flush with the perimeter of the autonomous vehicle.

5. A status indication controller for an autonomous vehicle, comprising:
- one or more alert databases;
- an alert engine configured to receive data from one or more sensors of the autonomous vehicle and an alert message that is determined using data from the one or more alert databases;
- a status engine configured to receive data from the one or more sensors of the autonomous vehicle and determine a status message;
- a transmitting engine configured to transmit the alert message that is determined and the status message that is determined to the autonomous vehicle; and
- a processing circuitry interconnecting the one or more alert databases, the alert engine, the status engine, and the transmitting engine, which is configured to activate optical fiber panel circuitry of a status indicator of the autonomous vehicle to generate streaming illumination, wherein the processing circuitry is further configured to transmit a respective electrical signal representative of the determined alert message and the determined status message to one or more surrounding autonomous vehicles, and wherein said respective electrical signal is transmitted within a radius range that is increased as a speed of the autonomous vehicle is increased.

6. The status indication controller of claim 5, wherein each of the one or more alert databases has one or more illumination categories of alert notifications.

7. The status indication controller of claim 5, wherein the status message that is determined includes one of a time of day, a number of passengers occupied within the autonomous vehicle, and a manual operation.

8. The status indication controller of claim 5, wherein the processing circuitry is further configured to activate the optical fiber panel circuitry of the status indicator to provide an illumination format for one or more of color, streaming, and geometry.

9. The status indication controller of claim 5, wherein, as the speed of the autonomous vehicle is increased, said respective electrical signal is transmitted to larger distances in forward and backward directions and to short distances in sideways directions.

10. A lighting system for an autonomous vehicle, comprising:
- a plurality of lamps positioned along the perimeter of the autonomous vehicle;
- a plurality of optical fiber panels positioned along the perimeter of the autonomous vehicle and bundled together along the perimeter of the autonomous vehicle, at least one of the optical fiber panels extending around at least a part of a periphery of one of the plurality of lamps; and
- a processing circuitry configured to activate the optical fiber panels in a predetermined illumination in response to a status of the autonomous vehicle, wherein the status includes one or more of a time of day, a number of passengers occupied within the autonomous vehicle, and an alert status during operation of the autonomous vehicle, wherein the status is determined via sensor data and status data received from the autonomous vehicle, wherein the alert status includes a malfunction status of the autonomous vehicle, wherein the optical fiber panels are configured to be flush with the perimeter of the autonomous vehicle, wherein the processing circuitry is further configured to transmit an electrical signal representative of the status to one or more surrounding autonomous vehicles, wherein the predetermined illumination includes one or more of a color, a geometry, or a pattern of illumination, wherein the optical fiber panels are configured to illuminate in a plurality of colors, a plurality of streaming rates, and a plurality of geometries, wherein at least one optical fiber panel is dedicated for a predetermined status, wherein said at least one optical fiber panel is configured to be activated according to a priority of statuses, and wherein the lamps include head lamps, tail lamps, brake lamps, or signal lamps.

* * * * *